United States Patent [19]
Britz et al.

[11] Patent Number: 6,122,084
[45] Date of Patent: Sep. 19, 2000

[54] HIGH DYNAMIC RANGE FREE-SPACE OPTICAL COMMUNICATION RECEIVER

[75] Inventors: David Michael Britz, Rumson; Jeevan Prakash Dodley, Parsippany; Christopher Lee Rutledge, Somerset, all of N.J.

[73] Assignee: AT&T Corp., New York, N.Y.

[21] Appl. No.: 09/033,236

[22] Filed: Mar. 3, 1998

[51] Int. Cl.$^7$ .......................... H04B 10/00; H04B 10/06
[52] U.S. Cl. .................. 359/172; 359/154; 359/189; 359/194; 385/140
[58] Field of Search ................... 359/189, 194, 359/154, 172; 385/140

[56] References Cited

U.S. PATENT DOCUMENTS

| 5,900,983 | 5/1999 | Ford et al. | 385/140 |
| 5,970,201 | 10/1999 | Anthony et al. | 385/140 |
| 5,986,799 | 11/1999 | Itou | 359/194 |

Primary Examiner—Kinfe-Michael Negash

[57] ABSTRACT

A free-space optical communications system and method in which a transmitter transmits a free-space optical communication beam to an optical receiver. The receiver includes an optical detector, an optical input level sensor and an optical attenuation device. The optical detector detects the optical communication beam, while the optical input level sensor senses an optical input level of the optical communication beam at the optical detector and outputs a control signal corresponding to the sensed optical input level. The optical attenuation device is responsive to the control signal by attenuating the optical input level of the optical communication beam to be less than a predetermined input level. The optical input level sensor includes a detector optical level sensor, a comparator circuit and a controller. The detector bias level sensor senses an optical level of the optical detector. The comparator circuit is coupled to the detector bias level sensor and compares the sensed optical level of the optical detector to predetermined threshold levels. The comparator circuit outputs a code signal relating a magnitude of the sensed optical level of the optical detector to the predetermined thresholds. The controller is responsive to the code signal by outputting the control signal.

30 Claims, 6 Drawing Sheets

HIGH DYNAMIC RANGE FREE-SPACE OPTICAL COMMUNICATION RECEIVER

BACKGROUND OF THE INVENTION

1. Field of the Invention

The present invention relates to the field of telecommunications. More particularly, the present invention relates to a system and a method for providing a free-space optical communication link.

2. Description of the Related Art

In a free-space optical communication link, link loss (path loss) variation of the communication link is significantly greater than the link loss of a fiber optic communication link. Additionally, the optical input power applied to an optical detector of a free-space optical communication link varies over a wide range depending on weather conditions between the transmitter and the receiver. Consequently, in longer distance links, the output of the optical transmitter for a conventional optical communication link is kept relatively high for compensating for link loss caused by relatively poor weather conditions.

Avalanche photo diode (APD) detectors are typically used for high-sensitivity and high-speed applications because the dynamic range of the optical input at the optical detector for such applications is large. Optical receivers using avalanche photo diode (APD) detectors, such as the model 54R receiver manufactured by BCP, typically have a device maximum safe condition of approximately +2 dBm, an operating condition of approximately −8 dBm, and a sensitivity of −29 dBm.

On a clear day, however, the optical input power applied to an optical detector is much greater than for a poor weather day because the optical signal is not attenuated as greatly by atmospheric conditions. As a result, the optical signal applied to the optical detector can exceed the safe operating limits of the detector and/or the first stage of the receiver saturates. When the optical input applied to a receiver exceeds the design limits for the receiver, a communication link will generally not function properly and, at an extreme, the detector may fail as a result of the large input level.

When the optical input level to an optical detector exceeds the safe operating limit for the detector, the optical receiver saturates causing the electrical output of the detector becomes distorted. To avoid the consequences of detector saturation, a conventional approach is to use an automatic gain control (AGC) amplifier stage as one of the electrical amplifier stages of the receiver. There are two possible locations in which an AGC amplifier is incorporated into circuitry of a receiver using a conventional AGC amplifier approach. The first is to integrate the AGC amplifier with the optical detector and the detector amplifier as part of a first stage. Placing an AGC amplifier at this point in the signal path results in a peaking and/or an undesirable roll-off in the frequency response as a function of the amplifier gain. The second possible location is to incorporate a monolithic AGC amplifier after an integrated detector amplifier. By placing an AGC amplifier at this point in the signal path, the large-signal handling capability of the first stage limits the optical input at the detector based on the saturation point of the detector stage.

A fallacy with using an conventional AGC circuit for avoiding the consequences of optical detector saturation is that the optical input applied to the detector is not always within the safe operating limits of the detector because the optical input power applied to the optical detector varies over a wide range based on weather conditions between the transmitter and the receiver.

What is needed is a way to enhance the optical input dynamic range of an integrated optical detector to avoid saturating the detector and for ensuring a safe operating range for the detector.

SUMMARY OF THE INVENTION

The present invention provides a way to enhance the optical input dynamic range of an integrated optical detector, thereby avoiding satuation of the detector and ensuring a safe operating range for the detector.

The advantages of the present invention are provided by a free-space optical communications system and a corresponding method in which a transmitter transmits a free-space optical communication beam to an optical receiver. According to the invention the receiver includes an optical detector, an optical input level sensor and an optical attenuation device. The optical detector, such as an avalanche photo diode detector, an array of photo diode detectors or a PIN photo diode detector, detects the optical communication beam, while the optical input level sensor senses an optical input level of the optical communication beam at the optical detector and outputs a control signal corresponding to the sensed optical input level. The optical attenuation device is responsive to the control signal by attenuating the optical input level of the optical communication beam to be less than a predetermined input level. Preferably, the optical attenuation device is an optical attenuation filter, such as an electronically-controlled liquid crystal variable attenuator, that preferably attenuates the optical input level of the optical communication beam by 6 dB increments.

The optical input level sensor includes a detector optical level sensor, a comparator circuit and a controller. The detector optical level sensor senses an optical level of the optical detector. The comparator circuit is coupled to the detector optical level sensor and compares the sensed optical level of the optical detector to predetermined threshold levels. The comparator circuit outputs a code signal relating a magnitude of the sensed optical level of the optical detector to the predetermined thresholds. The controller is responsive to the code signal by outputting the control signal.

The optical communication beam can include an information signal beam and a pilot tone signal beam. According to one configuration of the present invention, the information signal beam has a polarization that is orthogonal to a polarization of the pilot tone signal beam. The optical input level sensor senses a power level of the pilot tone signal beam that is related to the optical input level of the information signal beam at the optical detector. According to another configuration of the present invention, the information signal beam and the pilot tone signal each have a different transmission wavelength. The optical input level sensor senses a power level of the pilot tone signal beam that is related to the optical input level of the information signal beam at the optical detector. According to another embodiment of the present invention, a Frequency Shift Keyed (FSK) signal can be used in place of the pilot tone signal. The FSK signal can be used to transmit low-speed data, such as telemetry information, command signal and/or voice signals.

BRIEF DESCRIPTION OF THE DRAWING

The present invention is illustrated by way of example and not limitation in the accompanying figures in which like reference numerals indicate similar elements and in which.

DETAILED DESCRIPTION

The present invention increases the dynamic range of an optical receiver of an optical communication link by controlling the optical power applied to the optical detector in the optical domain, thereby providing safe operating conditions for the optical detector for a greater optical input power level applied to the receiver and an error free optical communication link. Further, optical power control is performed at the receiver without affecting the optical output power of the transmitter so that the optical power level applied to the input of the receiver can be as great as the optical power output level of the transmitter. The present invention also provides a wavelength selection capability so that pilot tone signals can be used for detecting an optical power level at the input to the receiver.

Figure 1:
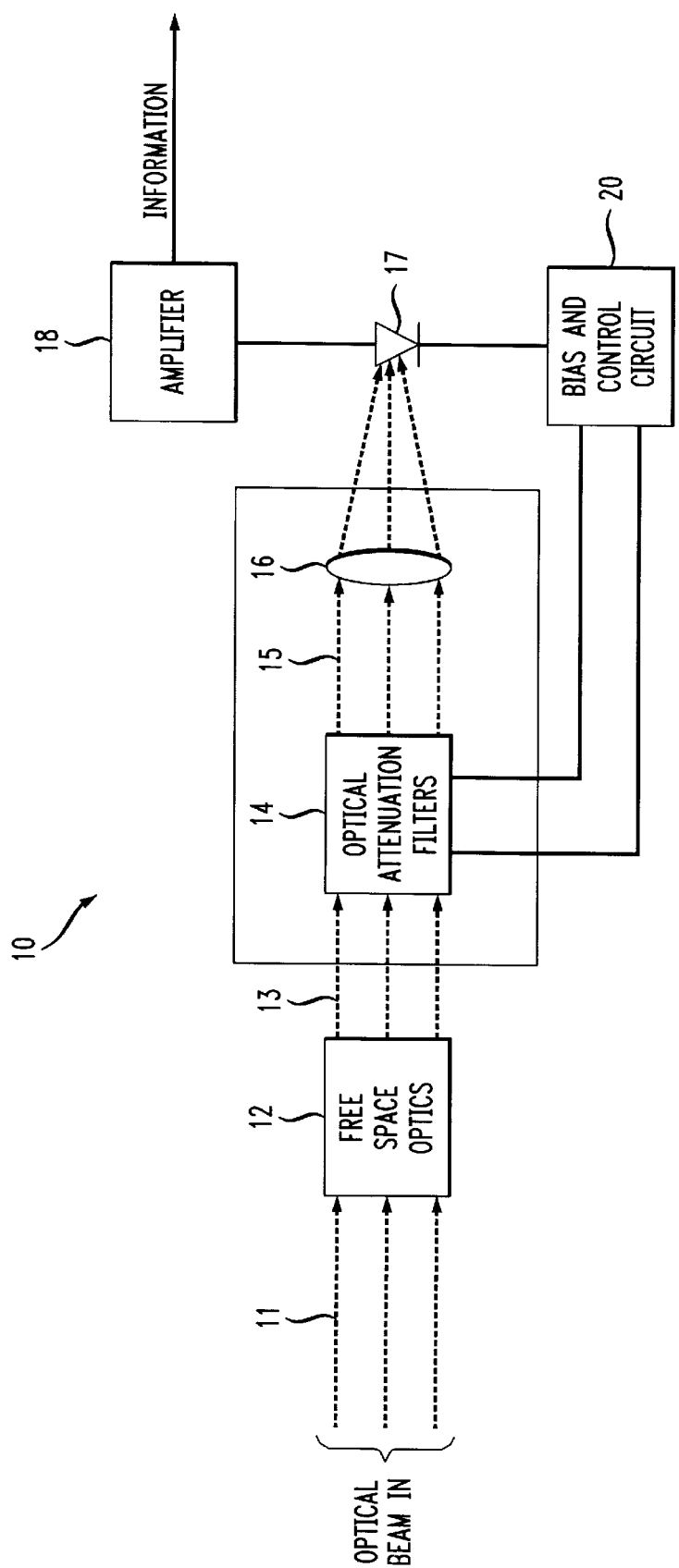
FIG. 1 shows a schematic block diagram of a first embodiment of a circuit for controlling optical power input to an optical detector according to the present invention.

Improving optical receiver dynamic range and ensuring safe operating conditions of an optical detector is achieved by controlling the optical power applied to the detector in the optical domain. FIG. 1 shows a schematic block diagram of a first embodiment of a circuit 10 for controlling optical power applied to an optical detector according to the present invention. An optical beam 11 transmitted from an optical transmitter (not shown) passes through free-space optics 12 and is collimated to an appropriate size for an optical attenuation filter (OAF) 14. OAF 14 is electronically controlled and provides attenuation of the input optical beam based on a bias voltage, or control signal, applied to OAF 14. An attenuated beam 15 emerging from OAF 14 is focused on optical detector 17 by optics 16. The information contained in beam 15 is detected by optical detector 17 and is amplified by amplifier 18.

Preferably, OAF 14 is an electronically-controlled liquid crystal variable attenuator (LCVA), commonly known as a light valve and available from 3M as a Privacy Electronic Film Panel device, or as a variable optical attenuator and polarizer available from Meadowlark Optics. An LCVA attenuates an optical signal by diffusing an optical beam and/or by polarizing and attenuating the beam. Alternatively, OAF 14 can be embodied using, for example, stepped neutral density filters (NDF), circular variable NDFs, as rotatable polarizing filters, or as spatial filters having pin holes of different diameters or an adjustable iris. Each of these particular types of OAF filters require physical motion for dynamically attenuating the optical signal.

Figure 2A:
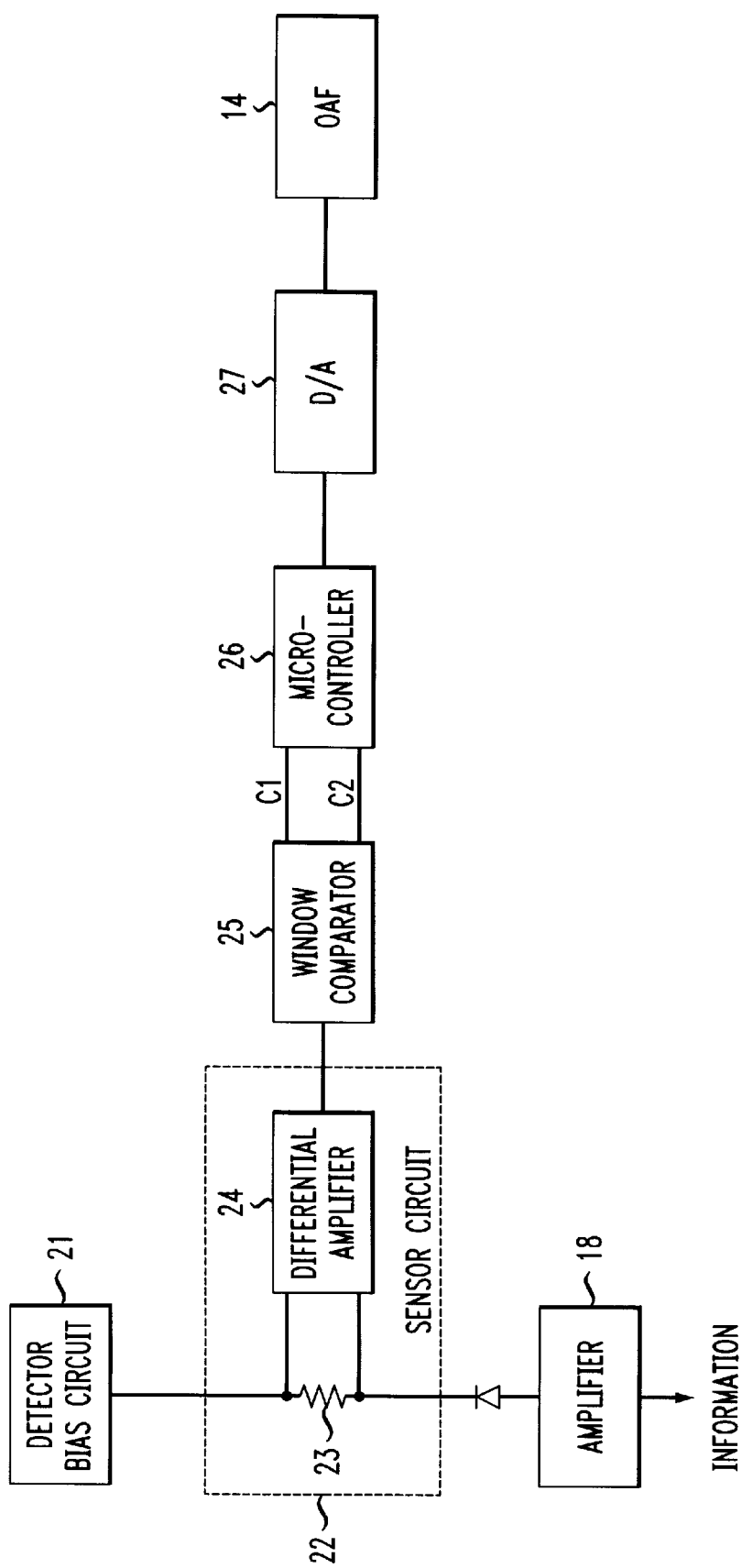
FIG. 2A shows a schematic block diagram of an exemplary bias and control circuit according to the present invention.

The bias voltage applied to OAF 14 is derived from a bias circuit and control circuit 20 that monitors, for example, the DC current flowing through optical detector 17. FIG. 2A shows a schematic block diagram of an exemplary bias and control circuit 20. Bias and control circuit 20 includes a detector bias circuit 21 and a sensor circuit 22. Sensor circuit 22 includes a sensor resistor 23 coupled to a differential amplifier 24. Bias current output by detector bias circuit 21 passes through sensor resistor 23 and optical detector 17. A voltage developed across resistor 23 corresponding to the optical input power level applied to detector 17 is amplified by differential amplifier 24. The output of amplifier 24 is coupled to a window comparator 25 that outputs a 2-bit code (C1,C2) that is representative of the output level of voltage developed across resistor 23. The 2-bit codes are input to a microcontroller 26, which interprets the code and outputs a corresponding binary code to a digital-to-analog converter (DAC) 27. DAC 27 outputs an analog control signal for controlling OAF 14.

Figure 2B:
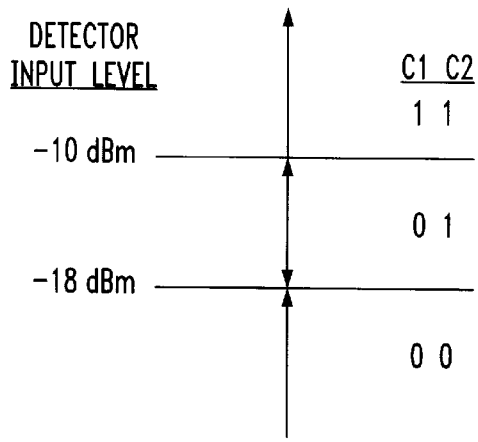
FIG. 2B depicts exemplary 2-bit codes output from a window comparator for a preferred range of optical input power levels applied to an optical detector.

OAF attenuation is preferably adjusted in 6 dB steps, but can be any suitable quantity for maintaining the input optical power level applied to detector 17 to be with in a safe operating range. For example, if the input power level applied to detector 17 is −18 dBm or less, then no OAF attenuation is added to the beam. If the input power level is greater than −10 dBm, then OAF attenuation is added until the optical input level at detector 17 is between −10 dBm and −18 dBm. FIG. 2B depicts exemplary 2-bit codes that are output by window comparator 25 for a preferred range of optical input power levels applied to optical detector 17. In FIG. 2B, when the optical power level applied to detector 17 is less than or equal to −18 dBm, the output code is (0,0). When the optical power level applied to detector 17 is between −18 dBm and −10 dBm, the output code is (0,1), and when the optical power level is greater than or equal to −10 dBm, the output code is (1,1).

Figure 3:
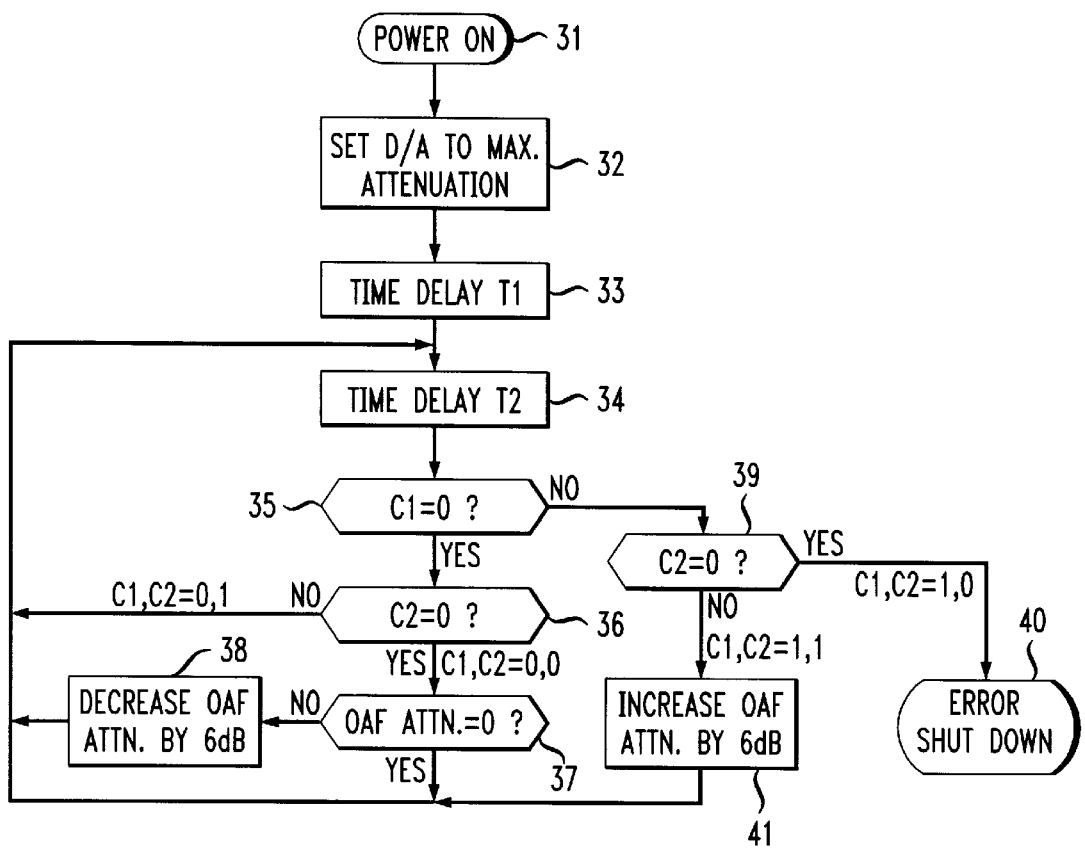
FIG. 3 shows a flow diagram for a process used by the exemplary bias and control circuit of FIG. 2.

FIG. 3 shows a flow diagram for a process 30 used by bias and control circuit 20. At step 31, power is applied to circuit 20. At step 32, microcontroller 26 initializes the output of DAC 27 to correspond to maximum of attenuation at OAF 14. At step 33, the microcontroller 26 waits a first predetermined period of time T1 for OAF 14 to respond the initial output of DAC 27.

At step 34, the microcontroller 26 waits a second predetermined period of time T2 for OAF 14 to settle. At step 35, microcontroller 26 determines whether bit C1 equals 0. If so, flow continues to step 36 where microcontroller 26 determines whether bit C2 equals 0. If not, flow returns to step 34. If so, flow continues to step 37 where microcontroller 26 determines whether OAF attenuation is 0 dB. If not, flow continues to step 38 where OAF attenuation is reduced by 6 dB.

If, at step 35, bit C1 does not equal 0, flow continues to step 39 where microcontroller 26 determines whether bit C2 equals 0. If bit C2 equals 0, then flow continues to step 40 where an error condition is output. If bit C2 equals 1, OAF attenuation is increased by 6 dB at step 41. Flow returns to step 34.

Figure 4:
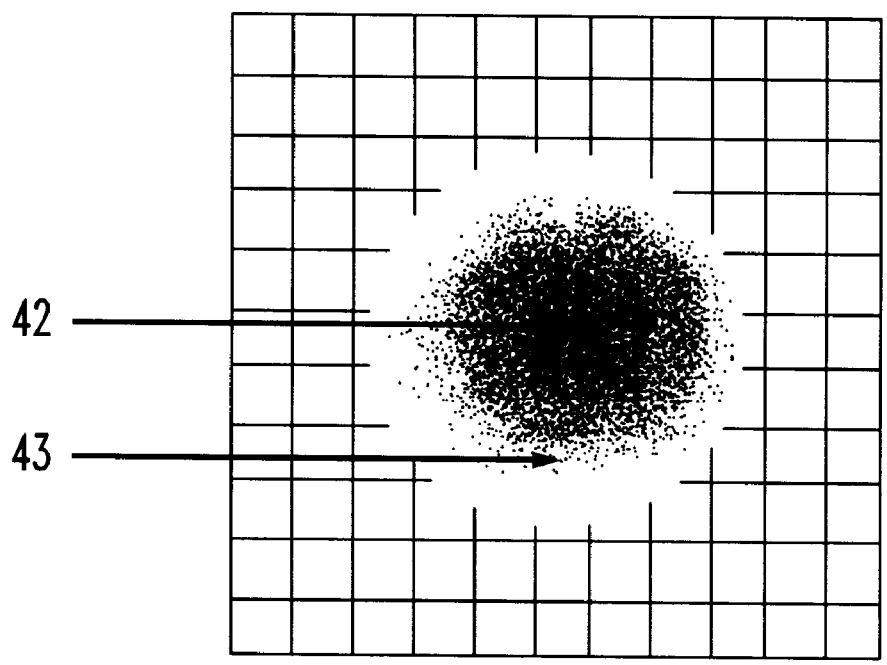
FIG. 4 depicts an intensity profile of an optical signal that is focussed on an active pixel sensor array.

When detector 17 is embodied as a sensor array detector, detection of the optical signal involves focusing the optical beam to be a truncated gaussian spot on a focal plane. Specific pixels near a saturated pixel region are monitored for detecting a saturated condition. The pixels of the detector that are illuminated by an evanescent portion of the spot are used for generating a control signal because these particular pixels are less likely to be overwhelmed by photonic energy. FIG. 4 depicts an intensity profile of an optical signal that is focussed on an active pixel sensor array to be a truncated gaussian spot. In FIG. 4, region 42 represents the saturated pixel region and region 43 represents the evanescently illuminated portion of the truncated gaussian spot.

The approach of FIGS. 1 and 2 of monitoring a DC voltage works satisfactorily for transmission signals that are continuous in nature and are not bursty in nature. To accommodate bursty type signals, a second embodiment of the present invention splits the optical beam used for the communication link into two paths at the transmitter. The beam of the first path is modulated with the information that is to be transmitted over the optical communication link, while the beam of the second path is modulated with a pilot tone. The polarization of each beam is made orthogonal with respect to each other, combined and then transmitted through the same free-space optics so that each beam traces the same path. A polarization splitter at the receiver splits the received beam into two beams, each having one of the polarizations. Each beam is then separately detected. The output level of pilot tone beam is detected by bias and control 20 of FIG. 2A and is used for controlling the optical power being applied to the detector of the information beam.

An alternative configuration of the second embodiment of the present invention is to use two independent laser sources at the transmitter: one for transmitting the information signal that is to-be-transmitted over the optical link and the other for transmitting a pilot tone signal. The wavelength of each laser source can be selected so that each beam encounters a similar atmospheric attenuation. As a result, a measure of attenuation of a beam having a first wavelength is representative of the attenuation of the beam having the second wavelength.

The output of each laser transmitter is sent through the same free-space optics. At the receiver, the two different wavelength beams are separated using a wave division multiplexing (WDM) filter, such as a grating-based filter available from JDS Optics or a suitable fiber optic component manufacturer, and are directed to two receivers. The level of the pilot tone beam is used for controlling the optical power level of the beam carrying the information. Preferably, the transmit power of the pilot tone laser is at least 20 dB less than the transmit power of the laser transmitting the information signal. Additionally, the sensitivity of the pilot tone receiver is preferably at least 20 dB greater than the sensitivity of the information receiver. The pilot tone detector can be a PIN diode-type detector because the frequency of the pilot tone signal is preferably less that 10 kHz, while the information beam detector can be an APD-type or a PIN diode-type detector, depending on the data rate and the sensitivity requirements. If the pilot tone detector saturates, or if the output amplitude of the pilot tone detector exceeds a predetermined threshold, then a large input to the information beam detector is indicated, and the optical power level being applied to the information beam detector must be reduced.

Figure 5A:
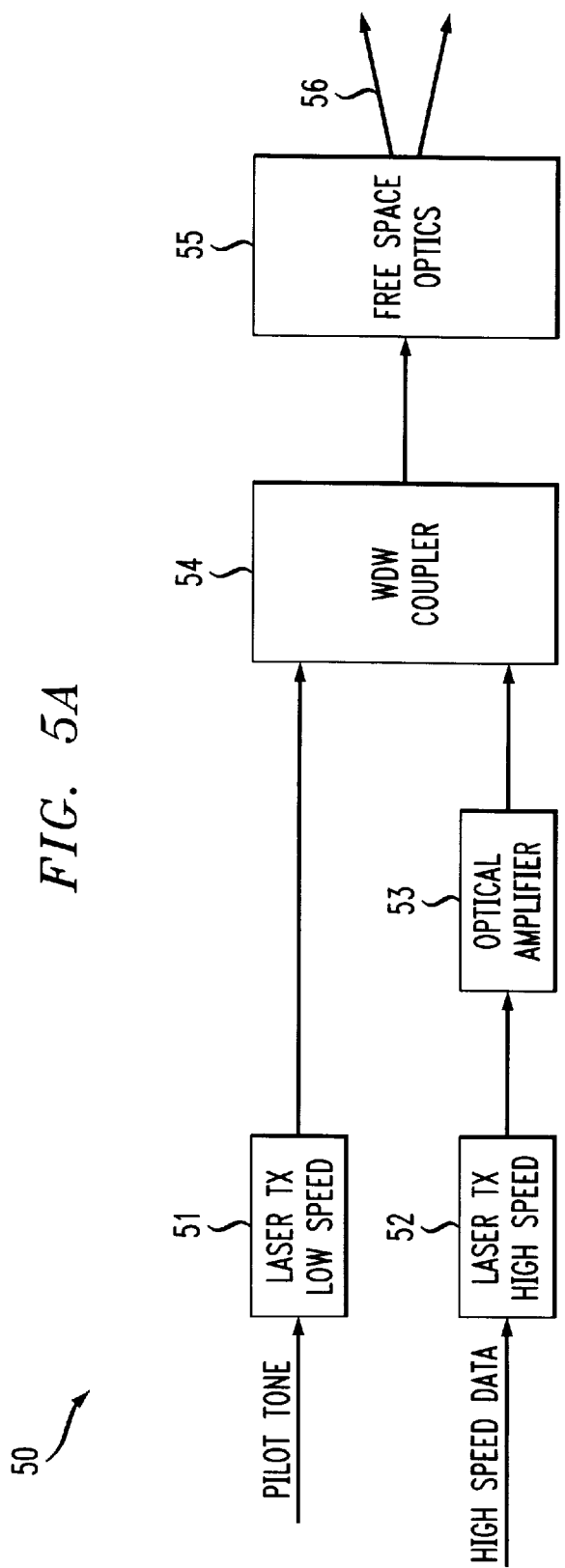
FIGS. 5A and 5B respectively show schematic block diagrams of a transmitter and a receiver of a free-space optical communication link system according to a second embodiment of the present invention.
Figure 5B:
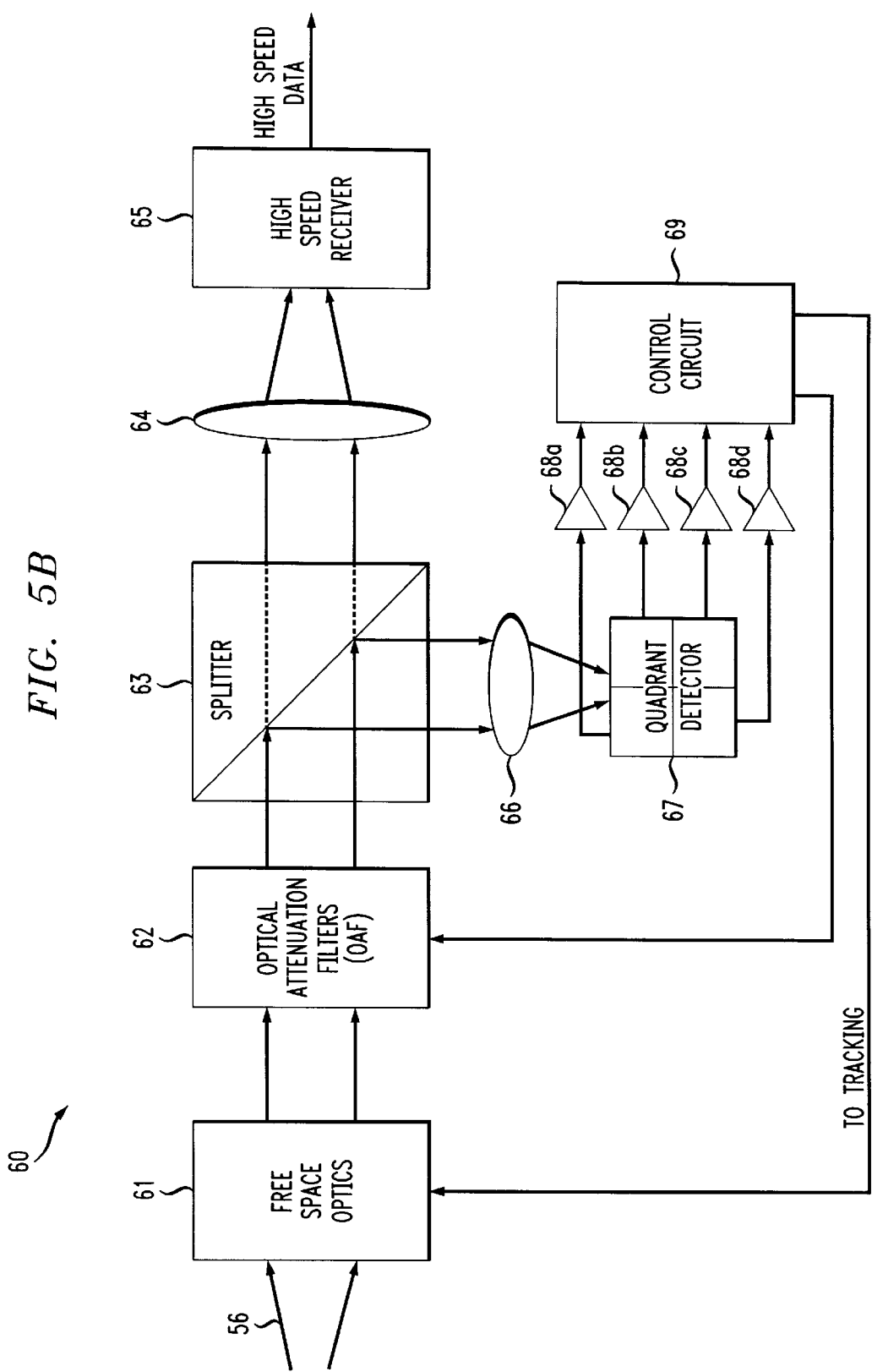

FIGS. 5A and 5B respectively show schematic block diagrams of a transmitter 50 and a receiver 60 of a free-space optical communication link system according to the second embodiment of the present invention. Transmitter 50 includes a low-speed laser 51 for transmitting a pilot tone and a high-speed laser 52 for transmitting high-speed data. Low-speed laser 51 is selected to have a wavelength that is different from the wavelength of high-speed laser source 52. Additionally, the output power level of laser 51 is selected to be less than the output power of laser 52. The output of laser source 52 is amplified by optical amplifier 53, if necessary, so that the transmitted beam meets a desired optical link budget. The pilot tone beam and the amplified high-speed data beam are combined using a WDM coupler 54 and then passed through free-space optics 55 for transmission as beam 56 to receiver 60. Free-space optics 55 are made from well-known optical components, such as lenses and other focusing devices.

At receiver 60, incoming optical beam 56 is passed through free-space optics 61 for tracking and collimation of the beam. Free-space optics 61 are made from well-known optical components, such as lenses and other focusing devices. Subsequently, a collimated beam is passed through an OAF 62. The output from OAF 62 is passed through a wavelength sensitive beam splitter 63, with the information beam being directed through optics 64 to a high-speed receiver 65, such as a BCP model 50R receiver. The pilot tone beam is directed through optics 66 to a quadrant detector 67.

The respective outputs of quadrant detector 67 are amplified by amplifiers 68a–68d. The output of amplifiers 68a–68d are input to control circuit 69. The magnitude of the amplified outputs correspond to the relative beam position of the information beam on the high-speed data detector and are used for tracking the beam. The amplified outputs are summed and compared to a reference level using a circuit similar to bias and control circuit 20 of FIG. 2A. When the summed outputs exceeds the reference level, excess power is being applied to the high-speed data detector. Preferably, the comparator circuit portion of control circuit 69 includes hysteresis thereby disabling the control function performed on OAF 62 until the input power level applied to receiver 65 varies by several dB.

No modifications are required to be made to high-speed receiver 65 because the link signal from which the OAF control signal is generated is obtained from the low-frequency pilot signal. Consequently, high-speed receiver 65 can be an off-the-shelf optical receiver purchased from any vendor. For example, a BCP receiver model 50R or a Broad Band Communications Products receiver having an APD-type detector can be used for high-speed receiver 65. The BCP model 50R receiver has a sensitivity of −29 dBm, a maximum input level of −8 dBm, approximately a 1000 MHz bandwidth, and a dynamic range of 21 dB. Preferably, sensitivity of the low-frequency pilot tone receiver is −54 dBm and can operate up to −13 dBm input power. Such a low-frequency optical receiver can easily be built. If the TX power output after an optical amplifier for the high speed data is 10 dBm, this specific embodiment can support a link loss of 39 dB for the high-speed data, that is, 10 dBm+29 dB=39 dB.

If the link loss is 5 dB on a clear day, for example, the optical input level applied to high-speed receiver 65 is +5 dBm. This level is significantly in excess of the safe operation of the receiver (−8 dBm). If the pilot tone laser transmit level is −10 dBm, the optical level seen by the low-speed optical receiver is −15 dBm, which is within the operating limits of the low-speed optical receiver. With the power control arrangement shown in FIG. 5B, the optical input power seen by high-speed receiver 65 is controlled so that it does not exceed the safe operation of the detector. Additionally, the dynamic range of the receiver system is effectively extended to 34 dB (5 dB+29 dB) and the +5 dBm level after the link (at the receiver end) provided an error free link.

A low-speed data signal can be used for monitoring or supervision purposes and can be included along with the pilot tone signal, or a frequency shift keying (FSK) modulated low-speed data can be used in place of pilot tone signal. Additional beams each having wavelengths that are spectrally close together and are close to the wavelength of the high-speed data beam can be combined with the high-speed data beam before optical amplifier 33 for increasing the overall throughput of the link. At receiver 60, a beam splitter (WDM) is then used for separating wavelength beams, with each respective beam being directed to a different receiver.

While the present invention has been described in connection with the illustrated embodiments, it will be appreciated and understood that modifications may be made without departing from the true spirit and scope of the invention.

What is claimed is:

1. An optical receiver system for a free-space optical communication system, the receiver system comprising:

an optical detector detecting a free-space optical communication beam;

an optical input level sensor sensing an optical input level of the optical communication beam at the optical detector and outputting a control signal corresponding to the sensed optical input level; and an optical attenuation device responsive to the control signal by attenuating the optical input level of the optical communication beam to be less than a predetermined input level;

wherein the optical attenuation device is an optical attenuation filter;

wherein the optical attenuation filter attenuates the optical input level of the optical communication beam by increments each having a predetermined magnitude.

2. The optical receiver system according to claim 1, wherein the optical detector is an avalanche photo diode detector.

3. The optical receiver system according to claim 1, wherein the optical detector is a PIN photo diode detector.

4. The optical receiver system according to claim 1, wherein the optical attenuation filter is an electronically-controlled liquid crystal variable attenuator.

5. The optical receiver system according to claim 1, wherein the predetermined magnitude is 6 dB.

6. An optical receiver system for a free-space optical communication system, the receiver system comprising:

an optical detector detecting a free-space optical communication beam;

an optical input level sensor sensing an optical input level of the optical communication beam at the optical detector and outputting a control signal corresponding to the sensed optical input level; and an optical attenuation device responsive to the control signal by attenuating the optical input level of the optical communication beam to be less than a predetermined input level;

wherein the optical input level sensor includes:

a detector optical level sensor sensing an optical level of the optical detector;

a comparator circuit, coupled to the detector optical level sensor, comparing the sensed optical level of the optical detector to predetermined threshold levels and outputting a code signal relating a magnitude of the sensed optical level of the optical detector to the predetermined thresholds;

a controller responsive to the code signal by outputting the control signal.

7. The optical receiver system according to claim 6, wherein the controller includes a digital-to-analog converter outputting the control signal.

8. An optical receiver system for a free-space optical communication system, the receiver system comprising:

an optical detector detecting a free-space optical communication beam;

an optical input level sensor sensing an optical input level of the optical communication beam at the optical detector and outputting a control signal corresponding to the sensed optical input level; and an optical attenuation device responsive to the control signal by attenuating the optical input level of the optical communication beam to be less than a predetermined input level;

wherein the optical communication beam includes an information signal beam and a pilot tone signal beam, the information signal beam having a polarization that is orthogonal to a polarization of the pilot tone signal beam, and wherein the optical input level sensor senses a power level of the pilot tone signal beam, the power level of the pilot tone signal beam being related to the optical input level of the information signal beam at the optical detector.

9. An optical receiver system for a free-space optical communication system, the receiver system comprising:

an optical detector detecting a free-space optical communication beam;

an optical input level sensor sensing an optical input level of the optical communication beam at the optical detector and outputting a control signal corresponding to the sensed optical input level; and an optical attenuation device responsive to the control signal by attenuating the optical input level of the optical communication beam to be less than a predetermined input level;

wherein the optical communication beam includes an information signal beam and a pilot tone signal beam, the information signal beam and the pilot tone signal beam each having a different transmission wavelength, and wherein the optical input level sensor senses a power level of the pilot tone signal beam, the power level of the pilot tone signal beam being related to the optical input level of the information signal beam at the optical detector.

10. An optical receiver system for a free-space optical communication system, the receiver system comprising:

an optical detector detecting a free-space optical communication beam;

an optical input level sensor sensing an optical input level of the optical communication beam at the optical detector and outputting a control signal corresponding to the sensed optical input level; and an optical attenuation device responsive to the control signal by attenuating the optical input level of the optical communication beam to be less than a predetermined input level;

wherein the optical communication beam includes an information signal beam and an FSK signal beam, the information signal beam and the FSK signal beam, each having a different transmission wavelength, and wherein the optical input level sensor senses a power level of the FSK signal beam, the power level of the FSK signal beam being related to the optical input level of the information signal beam at the optical detector.

11. An optical communications system, comprising:

a transmitter transmitting a free-space optical communication beam; and a receiver receiving the optical communication beam, the receiver including, an optical detector detecting the optical communication beam, an optical input level sensor sensing an optical input level of the optical communication beam at the optical detector and outputting a control signal corresponding to the sensed optical input level, and an optical attenuation device responsive to the control signal by attenuating the optical input level of the optical communication beam to be less than a predetermined input level;

wherein the optical attenuation device is an optical attenuation filter;

wherein the optical attenuation filter attenuates the optical input level of the optical communication beam by increments each having a predetermined magnitude.

12. The optical communications system according to claim 11, wherein the optical detector is an avalanche photo diode detector.

13. The optical communications system according to claim 11, wherein the optical detector is a PIN photo diode detector.

14. The optical communications system according to claim 11, wherein the optical attenuation filter is an electronically-controlled liquid crystal variable attenuator.

15. The optical communications system according to claim 11, wherein the predetermined magnitude is 6 dB.

16. An optical communications system, comprising:
a transmitter transmitting a free-space optical communication beam; and
a receiver receiving the optical communication beam, the receiver including,
an optical detector detecting the optical communication beam,
an optical input level sensor sensing an optical input level of the optical communication beam at the optical detector and outputting a control signal corresponding to the sensed optical input level, and
an optical attenuation device responsive to the control signal by attenuating the optical input level of the optical communication beam to be less than a predetermined input level;
wherein the optical input level sensor includes:
a detector optical level sensor sensing an optical level of the optical detector;
a comparator circuit, coupled to the detector optical level sensor, comparing the sensed optical level of the optical detector to predetermined threshold levels and outputting a code signal relating a magnitude of the sensed optical level of the optical detector to the predetermined thresholds;
a controller responsive to the code signal by outputting the control signal.

17. The optical communications system according to claim 16, wherein the controller includes a digital-to-analog converter outputting the control signal.

18. An optical communications system, comprising:
a transmitter transmitting a free-space optical communication beam; and
a receiver receiving the optical communication beam, the receiver including,
an optical detector detecting the optical communication beam,
an optical input level sensor sensing an optical input level of the optical communication beam at the optical detector and outputting a control signal corresponding to the sensed optical input level, and
an optical attenuation device responsive to the control signal by attenuating the optical input level of the optical communication beam to be less than a predetermined input level;
wherein the optical communication beam includes an information signal beam and a pilot tone signal beam, the information signal beam having a polarization that is orthogonal to a polarization of the pilot tone signal beam, and
wherein the optical input level sensor senses a power level of the pilot tone signal beam, the power level of the pilot tone signal beam being related to the optical input level of the information signal beam at the optical detector.

19. An optical communications system, comprising:
a transmitter transmitting a free-space optical communication beam; and
a receiver receiving the optical communication beam, the receiver including,
an optical detector detecting the optical communication beam,
an optical input level sensor sensing an optical input level of the optical communication beam at the optical detector and outputting a control signal corresponding to the sensed optical input level, and
an optical attenuation device responsive to the control signal by attenuating the optical input level of the optical communication beam to be less than a predetermined input level;
wherein the optical communication beam includes an information signal beam and a pilot tone signal beam, the information signal beam and the pilot tone signal beam each having a different transmission wavelength, and
wherein the optical input level sensor senses a power level of the pilot tone signal beam, the power level of the pilot tone signal beam being related to the optical input level of the information signal beam at the optical detector.

20. An optical communications system, comprising:
a transmitter transmitting a free-space optical communication beam; and
a receiver receiving the optical communication beam, the receiver including,
an optical detector detecting the optical communication beam,
an optical input level sensor sensing an optical input level of the optical communication beam at the optical detector and outputting a control signal corresponding to the sensed optical input level, and
an optical attenuation device responsive to the control signal by attenuating the optical input level of the optical communication beam to be less than a predetermined input level;
wherein the optical communication beam includes an information signal beam and an FSK signal beam, the information signal beam and the FSK signal beam each having a different transmission wavelength, and
wherein the optical input level sensor senses a power level of the FSK signal beam, the power level of the FSK signal beam being related to the optical input level of the information signal beam at the optical detector.

21. A method for receiving a free-space optical communication beam, the method comprising the steps of:
detecting an optical communication beam using an optical detector;

sensing an optical input level of the optical communication beam at the optical detector; and attenuating the optical input level of the optical communication beam to be less than a predetermined input level when the sensed optical input level of the communication beam is greater than a predetermined threshold;

wherein the step of attenuating the optical input level of the optical communication beam attenuates the optical communication beam by increments each having a predetermined magnitude.

22. The method according to claim 21, wherein the optical detector is an avalanche photo diode detector.

23. The method according to claim 21, wherein the optical detector is a PIN photo diode detector.

24. The method according to claim 21, wherein the optical communication beam is attenuated by an optical attenuation filter.

25. The method according to claim 24, wherein the optical attenuation filter is an electronically-controlled liquid crystal variable attenuator.

26. The method according to claim 21, wherein the predetermined magnitude is 6 dB.

27. A method for receiving a free-space optical communication beam, the method comprising the steps of:

detecting an optical communication beam using an optical detector;

sensing an optical input level of the optical communication beam at the optical detector; and attenuating the optical input level of the optical communication beam to be less than a predetermined input level when the sensed optical input level of the communication beam is greater than a predetermined threshold;

wherein the step of sensing the optical input level of the optical communication beam at the optical detector includes the steps of:

sensing an optical level of the optical detector; and comparing the sensed optical level of the optical detector to predetermined threshold levels; and generating a code signal relating a magnitude of the sensed optical level of the optical detector to the predetermined thresholds.

28. A method for receiving a free-space optical communication beam, the method comprising the steps of:

detecting an optical communication beam using an optical detector;

sensing an optical input level of the optical communication beam at the optical detector; and attenuating the optical input level of the optical communication beam to be less than a predetermined input level when the sensed optical input level of the communication beam is greater than a predetermined threshold;

wherein the optical communication beam includes an information signal beam and a pilot tone signal beam, the information signal beam having a polarization that is orthogonal to a polarization of the pilot tone signal beam, and wherein the step of sensing the optical input level of the optical communication beam at the optical detector includes the step of sensing a power level of the pilot tone signal beam, the power level of the pilot tone signal beam being related to the optical input level of the information signal beam at the optical detector.

29. A method for receiving a free-space optical communication beam, the method comprising the steps of:

detecting an optical communication beam using an optical detector;

sensing an optical input level of the optical communication beam at the optical detector; and attenuating the optical input level of the optical communication beam to be less than a predetermined input level when the sensed optical input level of the communication beam is greater than a predetermined threshold;

wherein the optical communication beam includes an information signal beam and a pilot tone signal beam, the information signal beam and the pilot tone signal beam each having a different transmission wavelength, and wherein the step of sensing the optical input level of the optical communication beam at the optical detector includes sensing a power level of the pilot tone signal beam, the power level of the pilot tone signal beam being related to the optical input level of the information signal beam at the optical detector.

30. A method for receiving a free-space optical communication beam, the method comprising the steps of:

detecting an optical communication beam using an optical detector;

sensing an optical input level of the optical communication beam at the optical detector; and attenuating the optical input level of the optical communication beam to be less than a predetermined input level when the sensed optical input level of the communication beam is greater than a predetermined threshold;

wherein the optical communication beam includes an information signal beam and an FSK signal beam, the information signal beam and the FSK signal beam each having a different transmission wavelength, and wherein the step of sensing the optical input level of the optical communication beam at the optical detector includes sensing a power level of the FSK signal beam, the power level of the FSK signal beam being related to the optical input level of the information signal beam at the optical detector.

* * * * *